Oct. 24, 1950

P. H. TOWNSEND ET AL 2,527,466

AIR ACTIVATED CONVEYER

Filed Feb. 21, 1949

INVENTOR.
Paul H. Townsend &
Henry Ripley Schemm
BY Barnes, Kisselle, Laughlin & Raisch
ATTORNEYS.

Oct. 24, 1950     P. H. TOWNSEND ET AL     2,527,466
AIR ACTIVATED CONVEYER
Filed Feb. 21, 1949                                            2 Sheets-Sheet 2
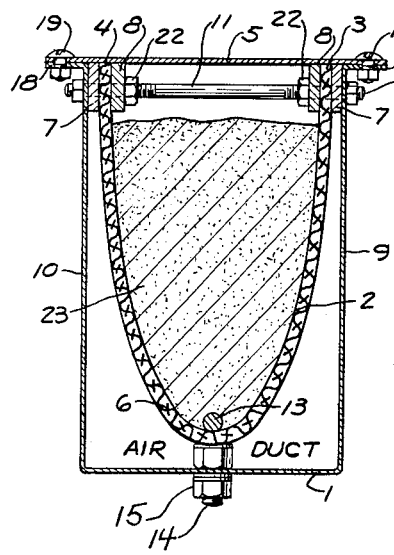
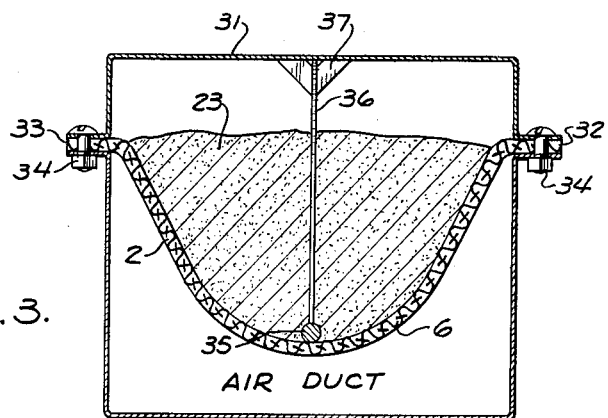
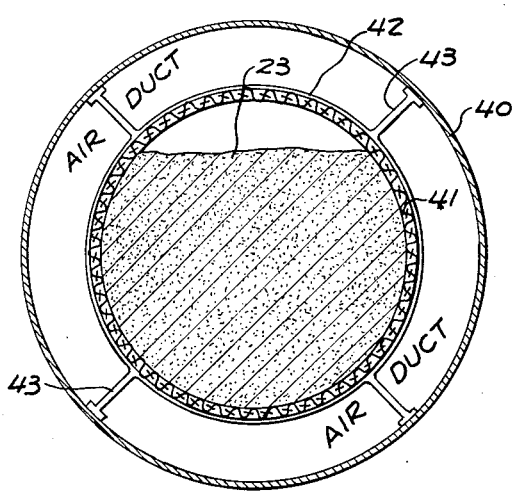
INVENTORS
Paul H. Townsend &
Henry Ripley Schemm
BY
ATTORNEYS.

Patented Oct. 24, 1950

2,527,466

UNITED STATES PATENT OFFICE 2,527,466

AIR ACTIVATED CONVEYER

Paul H. Townsend and Henry Ripley Schemm, Detroit, Mich., assignors to Huron Portland Cement Company, Detroit, Mich., a corporation of Michigan Application February 21, 1949, Serial No. 77,552

8 Claims. (Cl. 302—29)

This invention relates to an air activated conveyor.

In the copending application of Henry Ripley Schemm, Serial No. 602,004, filed June 28, 1945, now abandoned, there is shown an air activated conveyor wherein a low permeability porous medium, such as canvas belting, is used to diffuse the low pressure air into the pulverulent material being conveyed to aerate the same and cause the material to flow by gravity. In this prior conveyor the canvas belting constitutes a plane or flat air diffusing medium which divides the air plenum chamber from the pulverulent material conveying duct. Since the side walls of the pulverulent material conveying duct are not porous, the pulverulent material in contact with the side walls of the duct is not completely aerated and consequently there is substantial friction between the side walls of the duct and this portion of the pulverulent material being conveyed, which decreases the flow or conveying capacity of the air activated conveyor.

This invention concerns an improvement over the air activated conveyor shown in the above-mentioned copending application, and the principal object of this invention is that of producing an air activated conveyor having a substantially higher capacity in relation to the cross-sectional area or size of the duct or conveyor than in the air activated conveyors which preceded our invention. This fundamental object is accomplished by eliminating the side wall frictional resistance to the material passing through the conveyor.

This invention also contemplates an air activated conveyor which is of simple structure, inexpensive to operate, efficient in operation, and which is lighter and has a much smaller cross-section in relation to its conveying capacity of pulverulent material than the air activated conveyors heretofore known. Thus, our air activated conveyor is useful where the space is limited in which the conveyor must be mounted. Since our conveyor is lighter in relation to its conveying capacity of pulverulent material than other air activated conveyors, our conveyor is useful where it must span long distances because it can be mounted with fewer supports per length of conveyor than other air activated conveyors.

Fig. 2 is a section along the line 2—2 of Fig. 1.

Fig. 3 is a section similar to Fig. 2 of a modified form of our conveyor.

Fig. 4 is a section similar to Fig. 2 of a second modified form of our conveyor.

Figure 1:
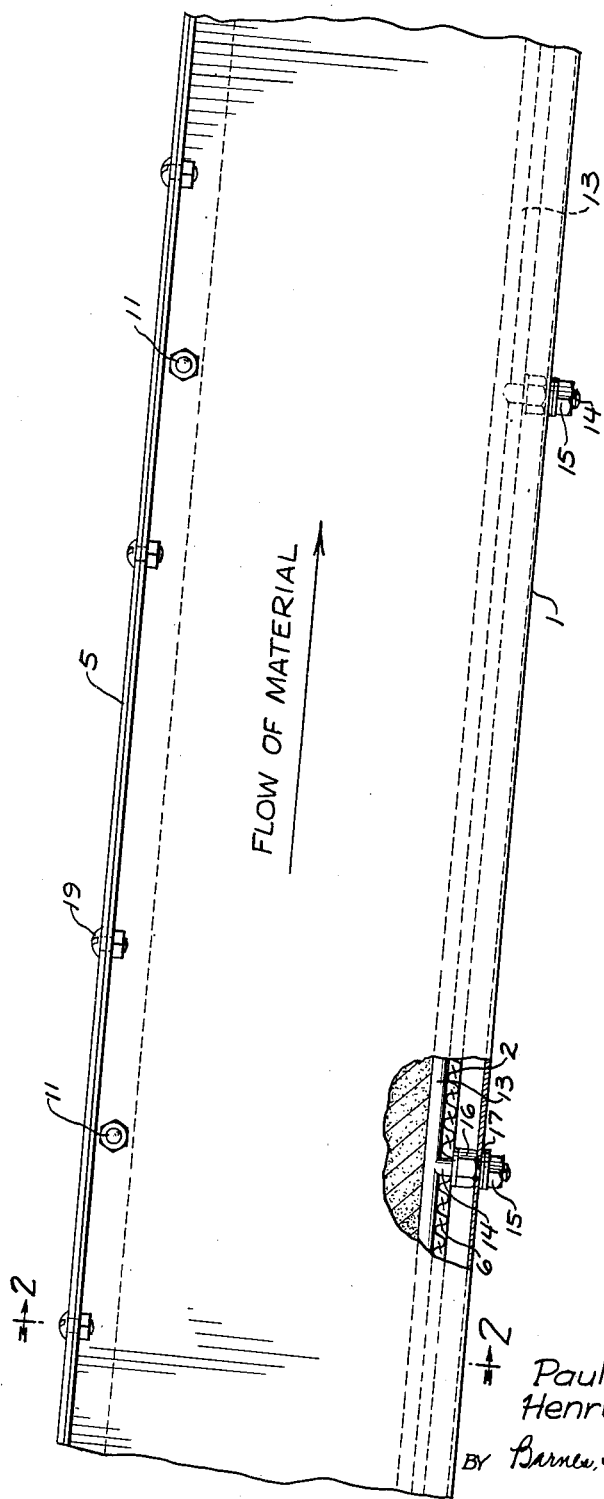
Fig. 1 is a side elevation showing our air activated conveyor.

Referring more particularly to the drawings, our conveyor comprises a casing 1 which is conveniently made in the form of a sheet metal channel. Casing 1 is imperforate and serves as an air duct for low pressure air. By "low pressure air" we mean air at a static pressure in the neighborhood of two to sixteen inches water gauge but in some instances, depending upon the head of material in the conveyor, this pressure will run as high as two and one-half pounds per square inch. Air can be supplied to casing 1 from any suitable source, such as a blower or fan (not shown).

A porous medium 2, which preferably takes the form of a web of woven fabric material, is suspended in the casing built in the form of a loop or V with the edges 3 and 4 positioned uppermost and adjacent the cover 5 of the casing and with the vertex or bight portion 6 of the porous medium extending along and adjacent the bottom of the casing 1.

The upper edge portions 3 and 4 of the porous medium 2 are each clamped between bars 7 and 8 which are bolted to the side walls 9 and 10 of casing 1 at intervals by tie and clamping rod 11. Thus, bars 7 and 8 serve as spacer bars which keep the side walls of porous medium 2 spaced from the side walls 9 and 10 of casing 1, thus assuring admission or free access of air to the porous medium 2 substantially throughout its entire area, and in particular to the uppermost portion of the porous medium. Should the porous medium 2 come in contact with the casing at any point, the flow of air through the porous medium would be stopped at that particular point which would prevent aeration of the material through the side wall and increase the friction between the side wall and pulverulent material.

A continuous retaining bar 13 is mounted over the bight portion 6 of porous medium 2 and is provided with integral threaded leg portions 14 which pass through the bottom of casing 1 and are secured in place by nuts 15. A spacer nut 16 is threaded over each leg 14 and positioned between the bight portion 6 and the base of casing 1. A rubber or leather gasket 17 is mounted between the bottom of the casing and each nut 15 to seal the opening in the bottom of the casing through which each leg 14 passes. The retaining bar 13 prevents the porous medium or fabric from buckling or collapsing when subjected to air pressure from the under side. This retaining bar can be eliminated in some instances depending upon the stiffness of the porous fabric used and the size of the conveyor, particularly where the conveyor has a very small cross-section and uses a very stiff fabric. The retaining bar, of course, is necessary in the case of a conveyor of large cross-section having a relatively flexible porous fabric.

Casing 1 is provided with out-turned integral flanges 18 along the edges of side walls 9 and 10 and cover 5 is secured to these flanges by bolts 19. The tie and clamping rods 11 act as stiffeners. The upper edges 3 and 4 of porous fabric 2 are clamped between bars 7 and 8 by turning nuts 22 outwardly on the threaded end portion of tie rods 11.

Porous medium 2 preferably takes the form of any low permeability woven fabric material and can be woven, e. g., from cotton or other fibers or from spun glass. We have found finely woven, heavy canvas belting especially advantageous as a porous medium. Such canvas belting is usually a woven multiple ply belting and is usually designated commercially by the number of plies it contains. Multiple ply woven canvas belting having any number of plies is preferred from two to eight plies.

Low pressure air can be supplied to casing 1 beneath porous fabric 2 anywhere along its length. The permeability of the porous fabric will be such that at the low pressures above indicated it will pass from two to twelve cubic feet per minute of air through each square foot of area. We have found the canvas belting to be exceptionally efficient where it passes about two to four cubic feet per minute of air per square foot of canvas at a static pressure in the neighborhood of two to eight inches water gauge. The air flowing through the porous medium 2 aerates the pulverulent material 23 which may take the form, for example, of dry powdered cement, mortar, cereal, flour or powdered plastic.

The casing 1 is inclined preferably at an angle slightly greater than the angle of repose of the aerated material. The flow of material is indicated by the arrow and the optimum angle of inclination to the horizontal for the conveyor is about five degrees.

In the modified form shown in Fig. 3, the porous fabric 2 is clamped along its edges 32 and 33 between two imperforate flanged metal channels 30 and 31 by bolts 34. Channel 30 serves as an air duct and the upper channel serving as a cover. The porous fabric web 2 is held down in the form of a loop by means of a retaining bar 35 similar to retaining bar 13 which holds fabric 2 in the form of a loop in the principal form of the invention, Figs. 1 and 2. However, in the modified form, Fig. 3, the retaining bar 35, which runs continuously along the bight portion 6 of porous fabric 2, is secured in place by a plurality of thin sheet metal struts 36 which are secured at intervals to the under side of cover 31 and retaining bar 35. Preferably struts 36 can be welded at their opposite ends to cover 31 and bar 35. Gussets 37, secured to struts 36 and the under side of cover 31, hold the struts rigid.

In Fig. 4 we have shown a typical section of another modified form of our air activated conveyor wherein the outer casing is in the form of an imperforate tube 40 within which is mounted, preferably concentric, a porous fabric tubing 41. Casing 40 can be constructed of either a rigid material, such as steel, or a flexible material, such as reinforced rubber hose or metal hose. The porous fabric hose 41 is secured in the center of the casing by a series of metal rings 42 which are slipped over the porous fabric hose and held in central position within duct 40 by rigid spacer legs 43. The inner ends of spacer legs 43 are preferably affixed, as by welding, to their respective rings 42. Rings 42 will be spaced along the porous tube 41 throughout its length so as to provide an air duct between porous tube 41 and imperforate tube 40. Air under pressure is introduced at any convenient point into the annular air duct space between the porous fabric hose and the casing and the pulverulent material 23 is aerated by the air flowing through porous fabric 41 and flows down the inclined tube 41 in the same manner as described with respect to the principal form of the invention.

The modified forms of air activated conveyors, like the principal form, will be inclined at an angle preferably of about five degrees to the horizontal. It is understood, of course, that this inclination can be less than five degrees (but never less than the angle of repose of the aerated material) or substantially more than five degrees but a greater inclination than five degrees is not needed and may be both undesirable and impossible for lack of sufficient head room in the building or space through which the inclined duct runs.

It is evident from the above that our air activated conveyor substantially aerates the pulverulent material being conveyed throughout the entire area of contact between the pulverulent material and the surface with which it contacts and this is accomplished by having the bottom and side walls which support the pulverulent material in the form of a porous flexible woven fabric which diffuses air from the air duct into the stream of pulverulent material.

We have found that a powdered material of given composition and fineness, when thoroughly aerated has a specific and constant angle of repose. By this we mean that, if a quantity of such material is placed in one pile on a horizontal surface and then thoroughly aerated, the mass of material will spread or run along the horizontal surface until its profile assumes a specific angle from horizontal; and that after having reached this angle of repose there will be no further movement regardless of the volume or time of aeration. "Aeration" as used herein means the introduction of air in volume sufficient to flow through the intersticial spaces in the material, but not in volume so great as to mechanically move the material, or any portion thereof (the latter we would term "blowing," not "aeration").

We claim:

1. In an apparatus for conveying pulverulent material, the combination with a conduit having an inlet for the material and a discharge outlet therefor and inclined downwardly from said inlet to said outlet, of a web of fabric material positioned within said conduit and serving as a support for the material being conveyed, said web of fabric material having a gas-permeability such that from about 2 to 4 cubic feet per minute of air per square foot of area will pass therethrough at a static pressure of from 2 to 8 inches water gauge and being generally in the form of a loop in vertical cross-section and having its side and bottom walls spaced from the side and bottom walls of said conduit, and means for forcing a gaseous medium into the space between the conduit and fabric web and through the bottom and side walls of the web throughout substantially the area of contact between the fabric web and the pulverulent material supported thereby whereby the pulverulent material is aerated and flows by gravity down the inclined support.

2. The apparatus claimed in claim 1 wherein the conduit is inclined downwardly at an angle at least equal to the angle of repose of the specific aerated material being conveyed and the said web is tightly woven multiple ply canvas.

3. The apparatus claimed in claim 2 wherein the said web extends longitudinally of the conduit and divides the same into an inner passageway for the pulverulent material and an outer passageway for the gaseous medium.

4. The apparatus claimed in claim 3 wherein the fabric web is in the form of a tube positioned within and spaced from said conduit.

5. The apparatus claimed in claim 1 including means for clamping the edge portions of said looped web to the side walls of the conduit.

6. In an apparatus for conveying pulverulent material, the combination with a conduit having an inlet for the material and a discharge outlet therefor and inclined downwardly from said inlet to said outlet, of a web of fabric material positioned within said conduit and serving as a support for the material being conveyed, said web of fabric material having a gas-permeability such that from about 2 to 4 cubic feet per minute of air per square foot of area will pass therethrough at a static pressure of from 2 to 8 inches water gauge and being generally in the form of a loop in vertical cross-section and having its side and bottom walls spaced from the side and bottom walls of said conduit, and means for forcing a gaseous medium into the space between the conduit and fabric web and through the bottom and side walls of the web throughout substantially the area of contact between the fabric web and the pulverulent material supported thereby, whereby the pulverulent material is aerated and flows by gravity down the inclined support, and means for holding the bight portion of said loop adjacent to, but spaced from, the bottom wall of said conduit whereby said loop is held from collapsing when subjected to the pressure of said gaseous medium.

7. In an apparatus for conveying pulverulent material, the combination with a conduit of a tube of fabric material positioned within said conduit and spaced from the bottom and side wall portions of said conduit, said tube having a gas-permeability such that from about 2 to 4 cubic feet per minute of air per square foot of area will pass therethrough at a static pressure of from 2 to 8 inches water gauge and having an inlet for the material and a discharge outlet therefor and inclined downwardly from said inlet to said outlet, and means for forcing a gaseous medium into the space between said conduit and fabric tube and through the bottom and side wall portions of said fabric tube for aerating the pulverulent material within the tube.

8. The apparatus claimed in claim 7 including means for supporting the fabric tube within the conduit and in spaced relation therewith.

PAUL H. TOWNSEND.
HENRY RIPLEY SCHEMM.

REFERENCES CITED

The following references are of record in the file of this patent:

UNITED STATES PATENTS

| Number | Name | Date |
|---|---|---|
| 544,969 | Dodge | Aug. 20, 1895 |
| 1,971,853 | Ihlefeldt | Aug. 28, 1934 |
| 2,219,283 | Horn | Oct. 29, 1940 |
| 2,316,814 | Schemm | Apr. 20, 1943 |

FOREIGN PATENTS

| Number | Country | Date |
|---|---|---|
| 419,703 | Great Britain | Nov. 16, 1934 |
| 503,286 | Great Britain | Apr. 4, 1939 |